Feb. 21, 1928.
J. H. HAMMOND, JR., ET AL
1,659,653
SYSTEM FOR CONTROLLING THE DIRECTION OF MOVING BODIES
Filed Nov. 15, 1918     11 Sheets-Sheet 1
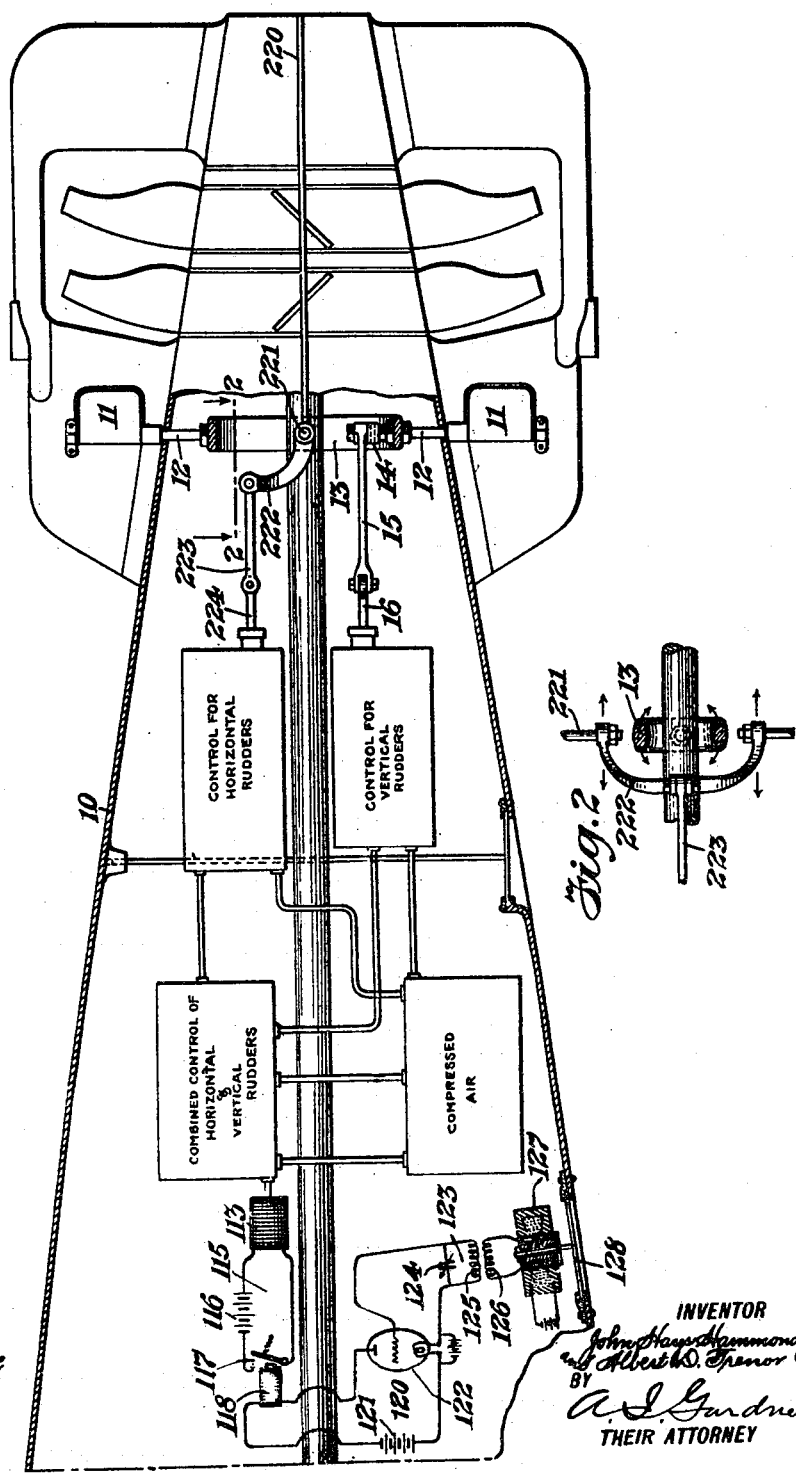

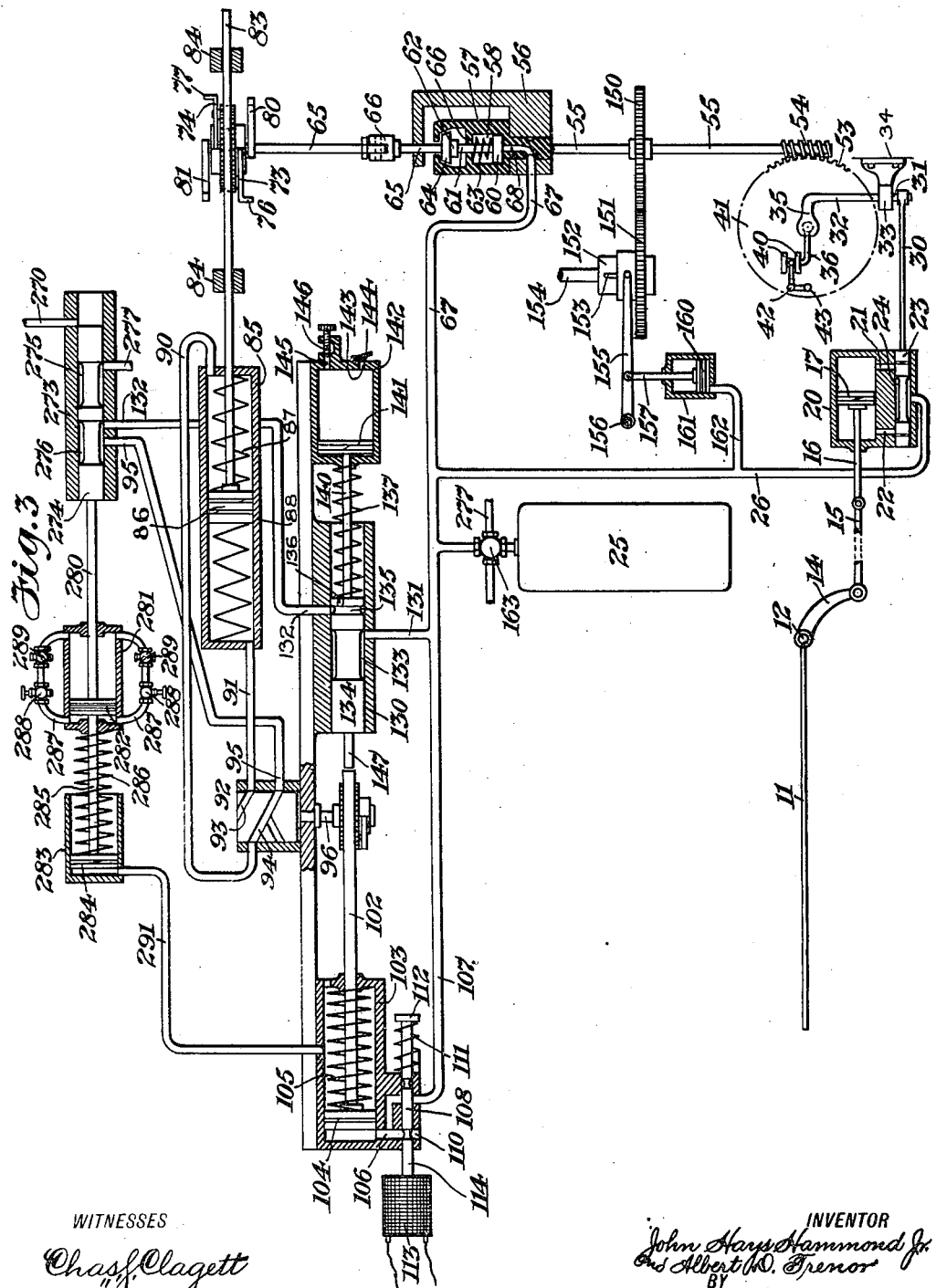

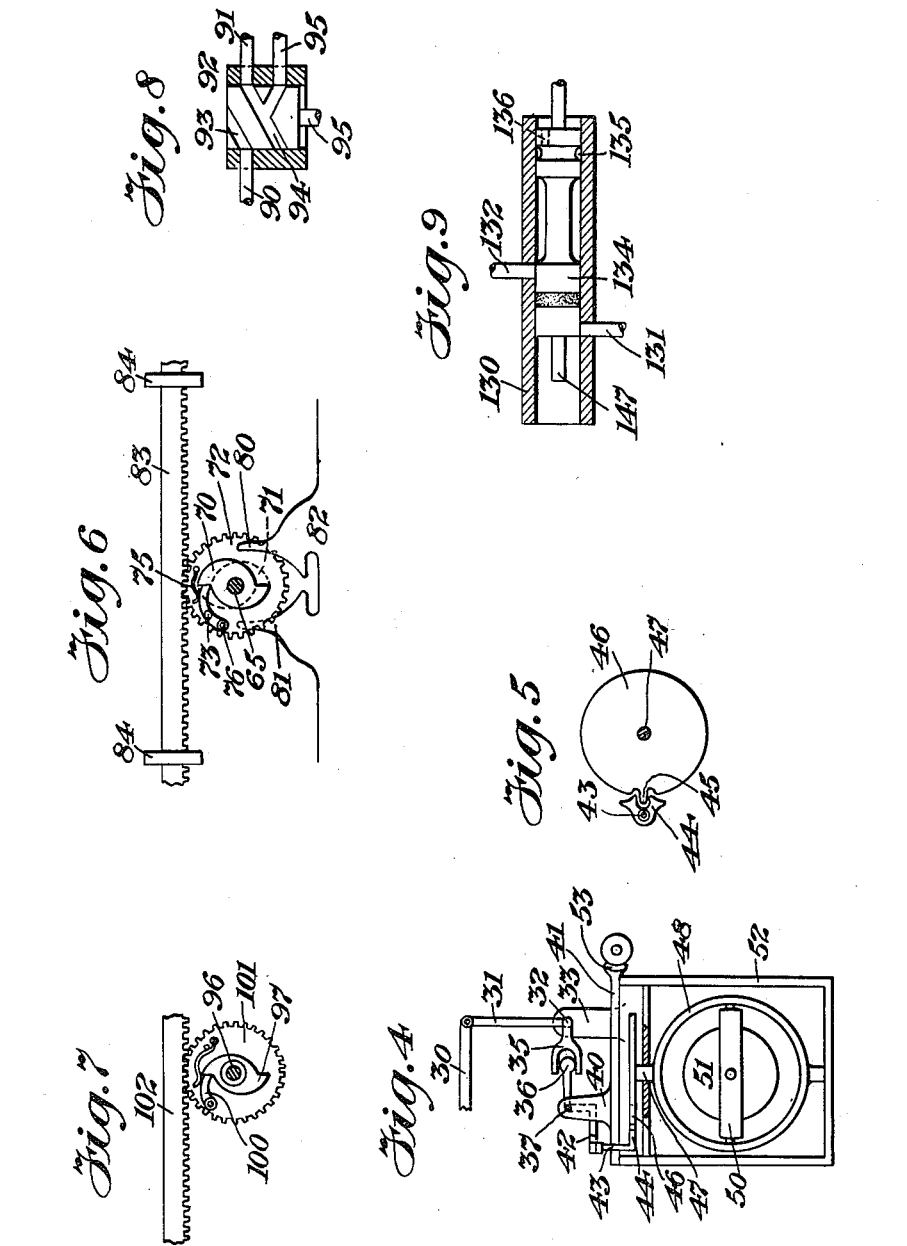

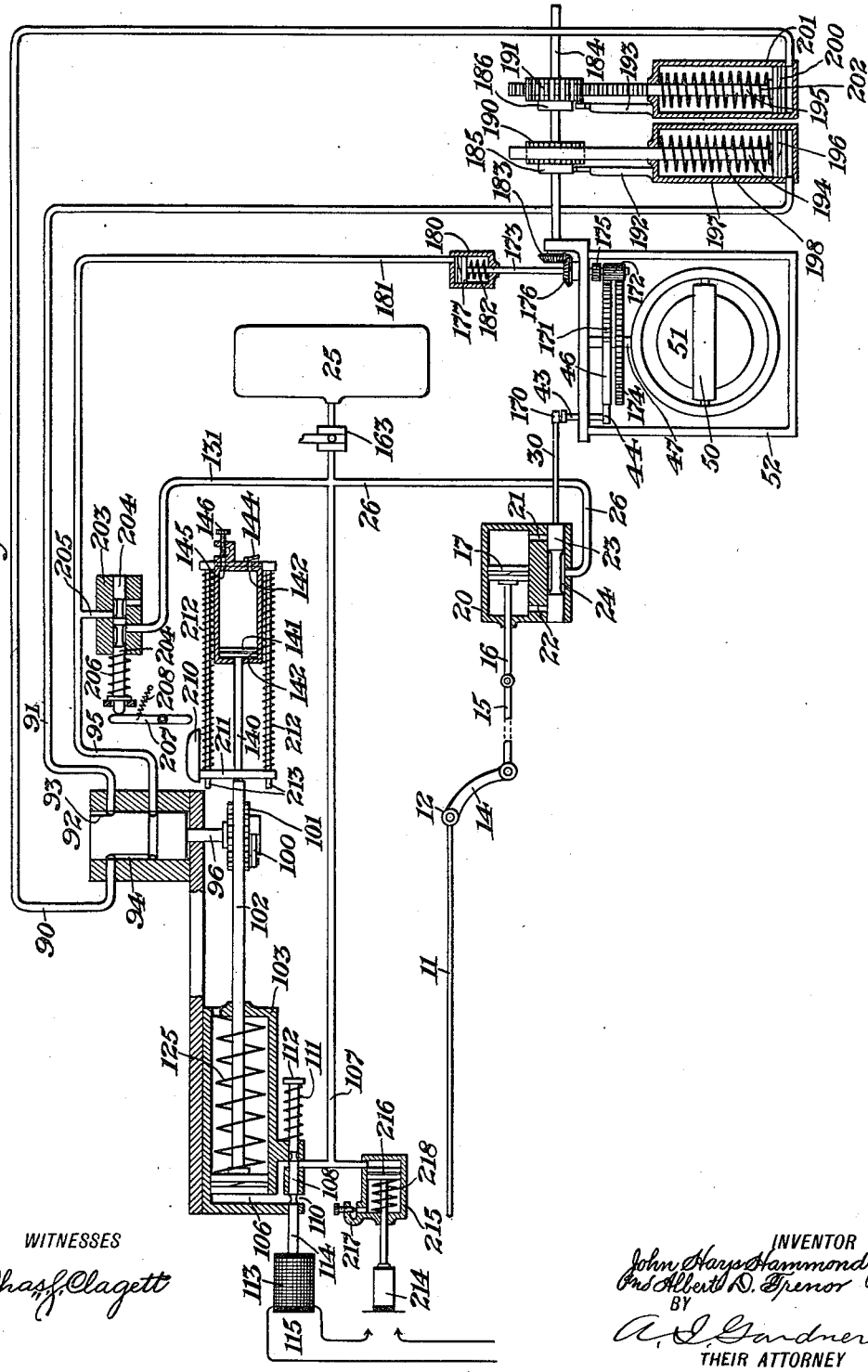

Feb. 21, 1928.  
J. H. HAMMOND, JR., ET AL  
1,659,653  
SYSTEM FOR CONTROLLING THE DIRECTION OF MOVING BODIES  
Filed Nov. 15, 1918  11 Sheets-Sheet 5
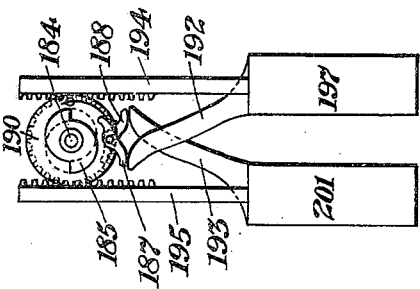
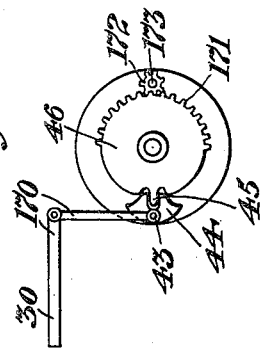
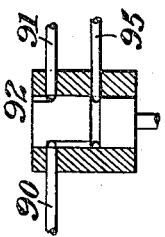
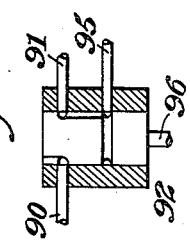
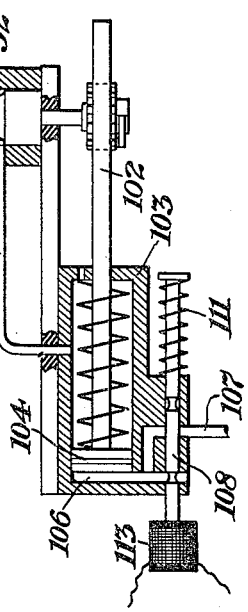
WITNESSES  
Chas. F. Clagett
INVENTOR  
John Hays Hammond Jr.  
and Albert D. Trenor  
BY  
A. J. Gardner  
THEIR ATTORNEYS Feb. 21, 1928. 1,659,653
J. H. HAMMOND, JR., ET AL
SYSTEM FOR CONTROLLING THE DIRECTION OF MOVING BODIES
Filed Nov. 15, 1918 11 Sheets-Sheet 6
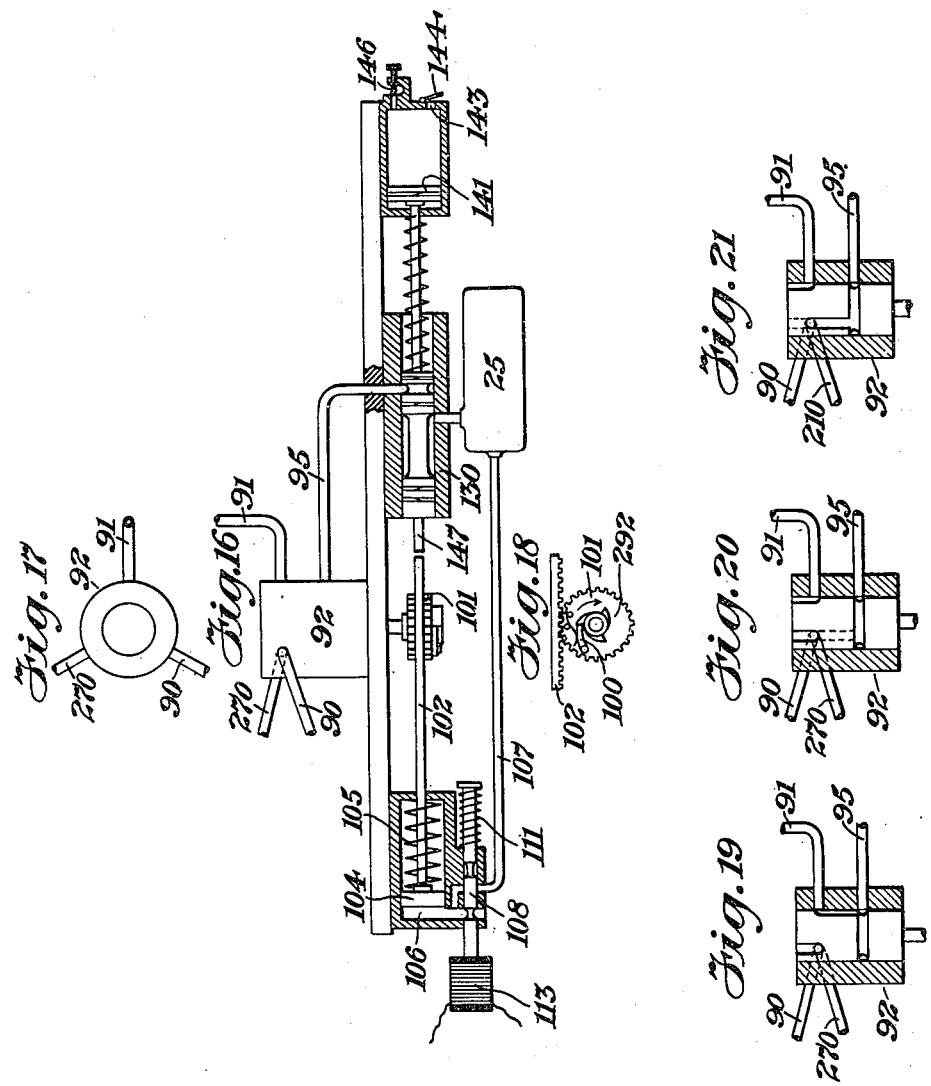
WITNESSES
Chas F. Clagett
INVENTOR
John Hays Hammond Jr.
and Albert D. Trenor
BY
A. G. Gardner
THEIR ATTORNEY

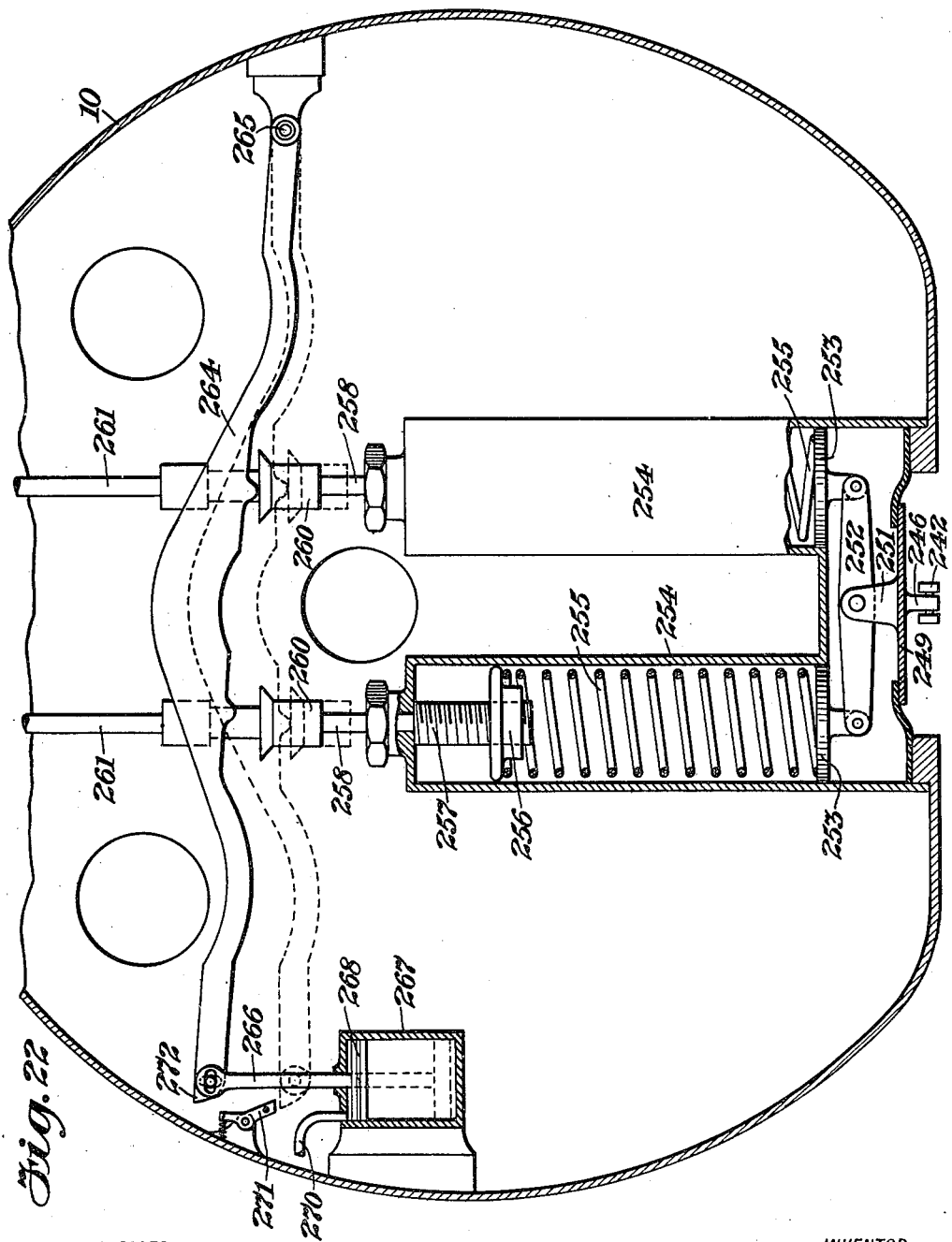

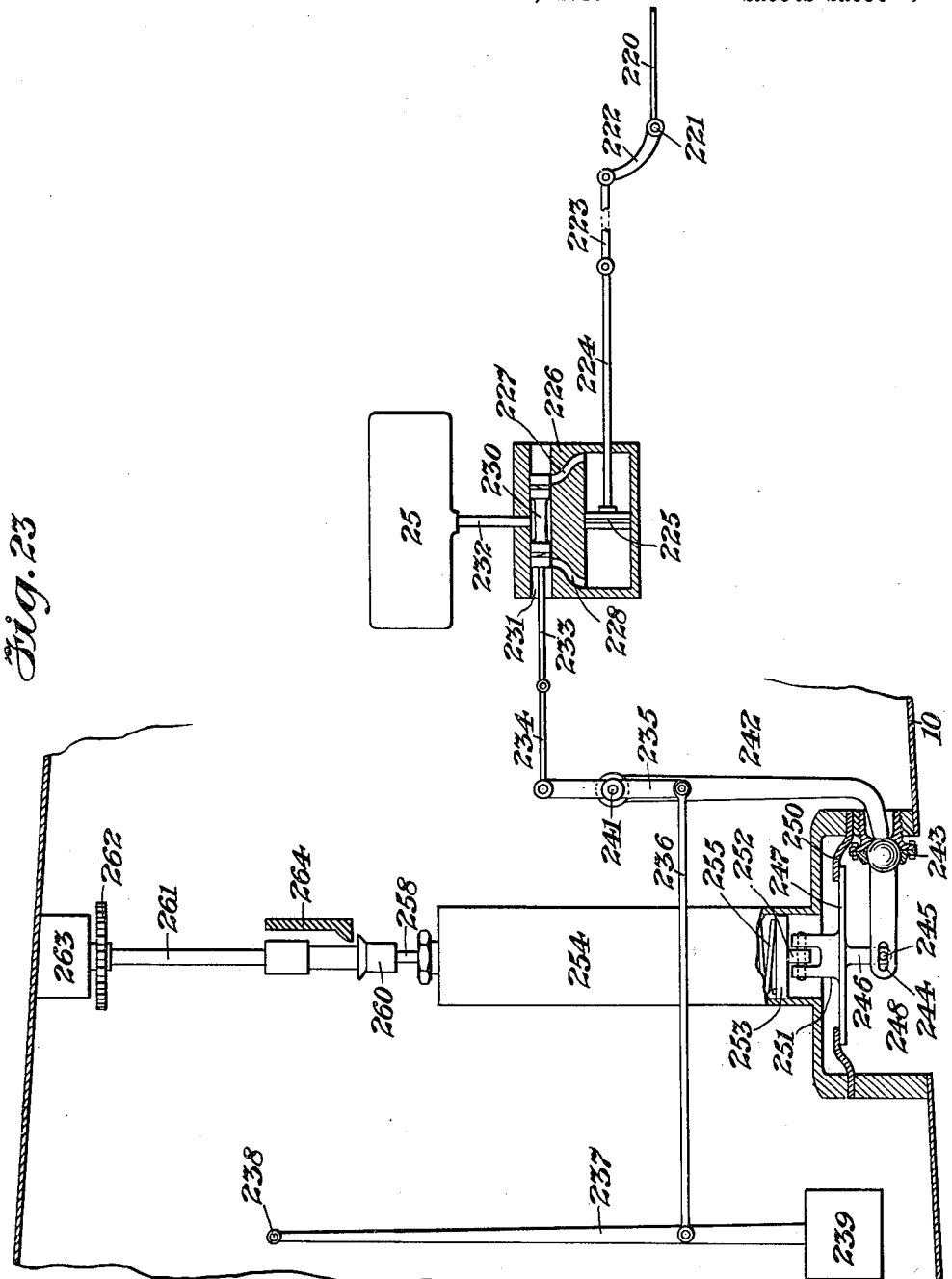

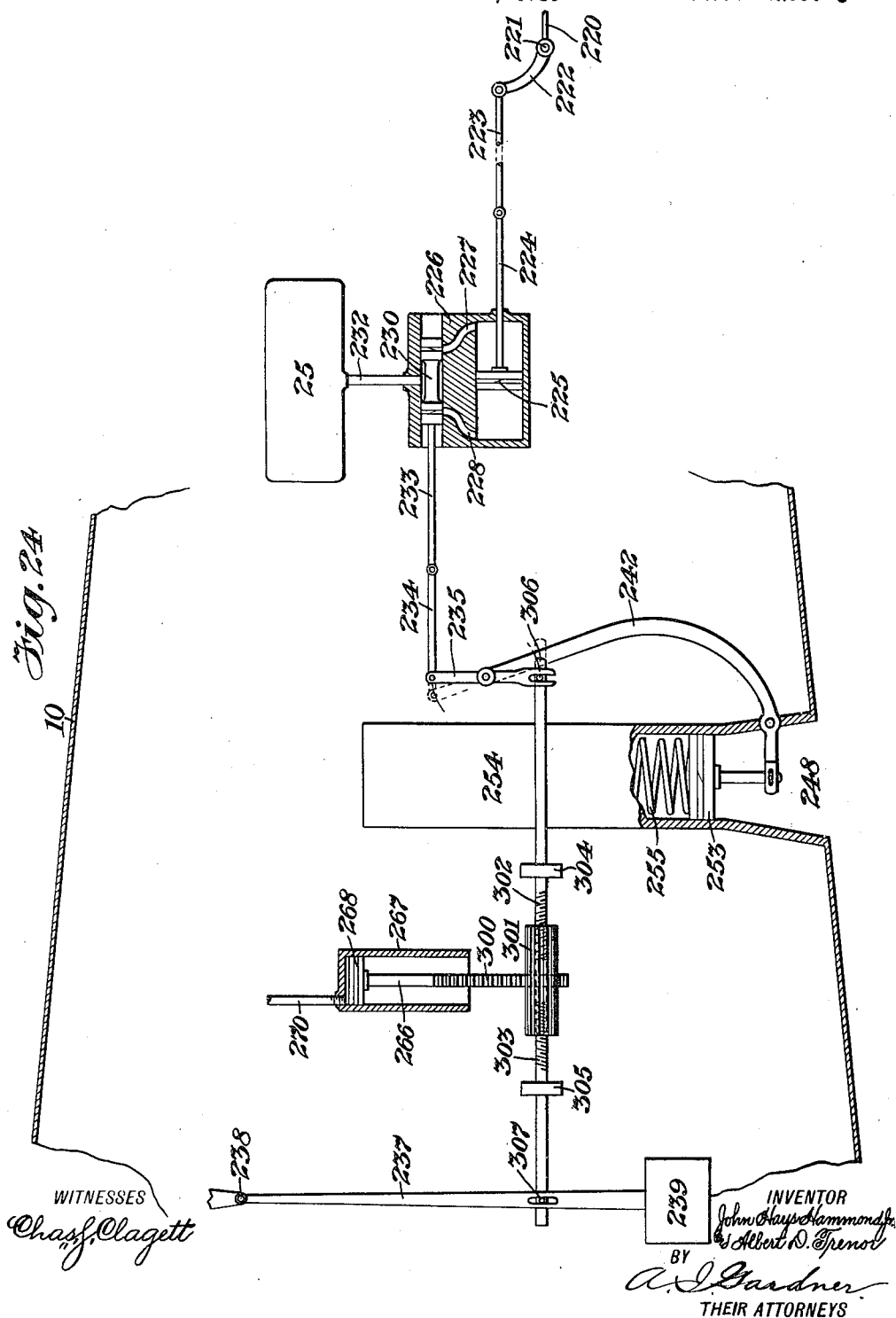

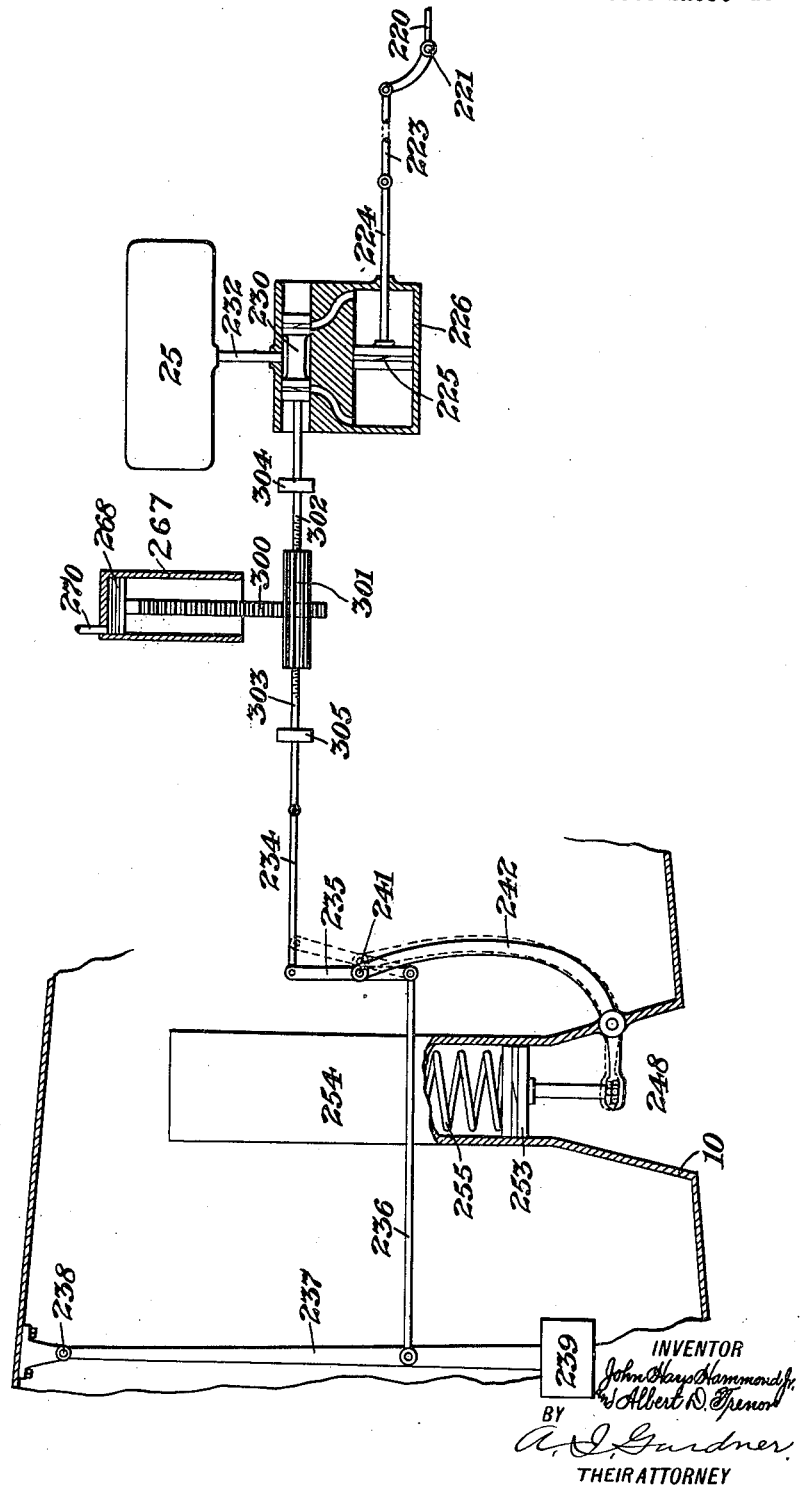

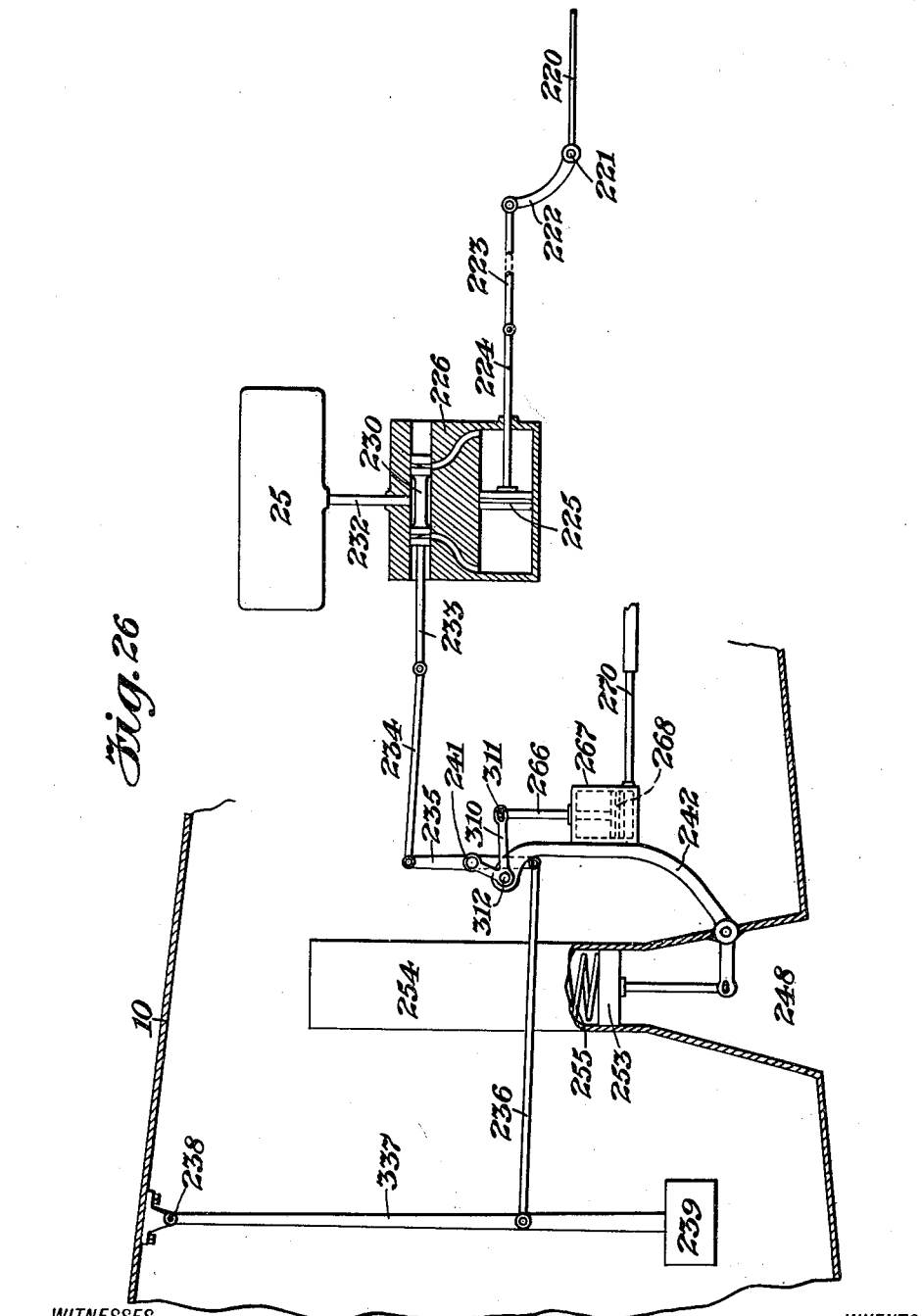

Patented Feb. 21, 1928.

1,659,653

UNITED STATES PATENT OFFICE.

JOHN HAYS HAMMOND, JR., OF GLOUCESTER, MASSACHUSETTS, AND ALBERT D. TRENOR, OF NEW YORK, N. Y.; SAID TRENOR ASSIGNOR TO SAID HAMMOND.

SYSTEM FOR CONTROLLING THE DIRECTION OF MOVING BODIES.

Application filed November 15, 1918. Serial No. 262,714.

Some of the objects of the present invention are: to provide means for automatically maintaining a moving body upon a predetermined course; to provide means operable at will to alter the course of a moving body; to provide means for controlling the turning movement of a moving body about a vertical axis; to provide means for controlling the turning movement of a moving body about a horizontal axis; to provide means for automatically maintaining a moving marine body at a predetermined depth in the water; to provide means for varying at will the submergence of a moving marine body; to provide means operable at will from a distance for controlling the turning movement of a moving body about a vertical axis in a predetermined manner; to provide means operable at will from a distance for controlling the turning movement of a moving body about a horizontal axis in a predetermined manner; to provide means operable at will from a distance for selectively controlling the turning movement of a moving body about either a horizontal or vertical axis; to provide means for rendering one turning control system inoperative while the other is operative; and to provide other improvements as will hereinafter appear.

In the accompanying drawings Fig. 1 represents diagrammatically a control system embodying the present invention arranged upon a moving marine body such as a torpedo; Fig. 2 represents a section on line 2—2 of Fig. 1; Fig. 3 represents a diagrammatic detail of one form of the system for controlling the turning movement of a body automatically or at will about a vertical axis; Fig. 4 represents a detail in elevation of the stabilizing mechanism and its adjuncts; Fig. 5 represents a fragmentary detail in plan of a disc controlled by the stabilizing mechanism; Fig. 6 represents a side elevation of a ratchet mechanism employed in connection with a distant control; Fig. 7 represents a side elevation of another ratchet mechanism employed with the distant control; Fig. 8 represents a section of a valve for controlling the motive fluid; Fig. 9 represents a section of one of the pressure fluid control valves; Fig. 10 represents diagrammatically another form of the invention for controlling the direction of movement of a body about a vertical axis; Figs. 11 and 12 represent sections of a motive fluid rotary valve in different operative positions; Fig. 13 represents a plan of another form of rudder mechanism controlled by the stabilizing device; Fig. 14 represents a sectional elevation of the main distant controlled valve and its associated parts; Fig. 15 represents an end elevation of the main ratchet control mechanism employed with the modification shown in Fig. 10; Fig. 16 represents a side elevation partly in section of a modified form of the valve control mechanisms and retarding means therefor; Fig. 17 represents a plan of the rotary valve of Fig. 16; Fig. 18 represents a side elevation of the ratchet mechanism of Fig. 16; Figs. 19, 20 and 21 represent the rotary control valve in different operative positions; Fig. 22 represents a transverse section of the body showing one form of the system for controlling the turning movement of a body about a horizontal axis; Fig. 23 represents a longitudinal section of the body showing the same system in side elevation and partly in section; Fig. 24 represents a modification of the system shown in Fig. 23; Fig. 25 represents another modified form of depth control; and Fig. 26 represents a further modification of the depth control mechanism.

Referring to the drawings and more particularly to Figs. 1 and 3, one form of the present invention for controlling the direction of movement of a dirigible body about either a vertical axis or a horizontal axis, or both as the case may be, is shown and whereas in a torpedo body 10 is taken for illustrative purposes and the automatic direction control means is diagrammatically indicated therein in Fig. 1.

For varying the direction of movement of the torpedo 10 about a vertical axis, a two blade rudder 11 is preferably, though not necessarily, employed and rigidly mounted for movement with a vertical rudder post 12 whereby the rudder 11 can be moved relative to the torpedo 10 to control the direction of movement thereof. In the present instance the post 12 comprises two main parts rigidly connected together by a yoke 13 which is shifted according to requirements by an operating lever 14 pivotally secured to a connecting rod 15.

For the purpose of swinging the rudder 11 to a desired position to cause the movable body to be directed as required, the rod 15 is pivotally secured to a piston rod 16 of a piston 17 which is mounted for reciprocating movement in a cylinder 20. The ends of the cylinder 20 are respectively provided with ports 21 and 22 which are controlled by a slide valve 23 operating in a pressure fluid chest 24 which is in communication with a pressure fluid reservoir 25 by way of a pipe 26. Thus the piston 17 is moved to the left or to the right according to the position of the valve 23 with respect to the ports 21 and 22. The respective ends of the cylinder 20 exhaust by way of the open ends of the chest 24 when the valve 23 has moved to full open position in either direction.

For actuating the slide valve 23 and also for maintaining it in a position to cause the torpedo to move upon a predetermined course two mechanisms are here employed, the one operating automatically through a suitable stabilizing device to operate the valve 23 and the other operating under a distant control to operate the valve 23. Those parts common to the two mechanisms comprise a connecting rod 30 fixed at one end to the valve 23 and at the other pivotally connected to a link 31 which is rigidly fixed to a rock shaft 32 in order that it may be moved to actuate the rod 30. The rock shaft 32 is journalled in a suitable bracket 33 supported by a fixed part 34 and has integral therewith a bifurcated lever 35 which straddles a ball lever 36 the movement of which causes the shaft 32 to rock in the desired direction. This lever 36 is rigidly secured to a pivot 37, journalled in ears 40 fast to a cover 41, and movement is communicated to the pivot 37 through a lever system 42 controlled by the rotary movement of a spindle 43 which passes through the cover 41 and carries a laterally disposed bifurcated plate 44.

For operating the valve rod 30 automatically by a stabilizing mechanism the bifurcated plate 44 straddles a dog or lug 45 formed in a disc 46 and projecting laterally from the periphery thereof, the arrangement being such that turning movement of the disc 46 in either direction will cause the plate 44 to turn in the opposite direction. The disc 46 is fast to one of the trunnions 47 of a gimbal ring 48 and a second gimbal ring 50 is carried by the ring 48 and supports a gyroscope 51 which is spun by any suitable means. A suitable casing 52 encloses the stabilizing device above described. From the foregoing it will be evident, since the disc 46 is held fixed in space by the gyro 51, that any movement of the torpedo from its course will be communicated to the plate 44, thus if the movement were to the right the plate 44 would be turned clockwise thereby turning the spindle 43 clockwise and through the several lever connections shift the valve 23 to the right, as seen in Fig. 3, and admit pressure fluid to the right end of the cylinder 20 and cause the piston 17 to operate the rudder in a clockwise direction.

For actuating the slide valve 23 at will, for example from a station distant from the boat, torpedo or other movable body, the cover 41 has a portion of its periphery provided with a segment of a worm gear 53 which is in mesh with a worm 54 upon a shaft 55. This shaft 55 has a suitable bearing in a fixed frame 56 and has keyed thereon a cylinder 57 for rotation therewith, which latter provides a chamber 58 arranged to receive a piston 60, the dimensions of this chamber being sufficient to permit free reciprocation of the piston 60 within desired limits. To the piston 60 is rigidly secured a piston-rod 61 which carries a disc 62 at its outer end. The piston 60 is held in its innermost position by a spring 63. The disc 62 cooperates with a clutch 64, but is not connected thereto. The clutch 64 is separate from the shaft 55 and its adjuncts and may be moved relative thereto in an axial direction and is mounted upon a split shaft 65, the parts of which are joined by a coupling 66, which allows endwise movement of the clutch 64 without breaking the connection of the shaft 65 and this movement of the clutch 64 is controlled in one direction by compressed air or any suitable pressure fluid admitted from a supply pipe 67 by way of the port 68. The rotary movement of the shaft 55 is communicated to the shaft 65 through the medium of the friction clutch disc 64, which is rigid with the shaft 65 and arranged in juxtaposed relation to a correspondingly beveled face on the cylinder 57. The supply pipe 67 is in communication with the main pressure fluid reservoir 25. The shaft 65 has fixedly secured thereto a pair of ratchets 70 and 71 arranged in opposed relation so that one can turn the shaft 65 in a clockwise direction and the other can turn the shaft 65 in a counterclockwise direction, and the operating means for these ratchets consists of a gear 72 loosely mounted on the shaft 65 so that it may rotate freely with respect thereto and having on opposite faces pivoted pawls 73 and 74 for engaging the respective ratchets 70 and 71. Springs 75 coact respectively with said pawls 73 and 74 to maintain them in operative engagement with the aforesaid ratchets. In order to cause either pawl to be removed from engagement with its ratchet so that the shaft 65 can be turned in the direction desired without interference from the other pawl and ratchet, the said pawls are respectively provided with laterally disposed lugs 76 and 77 which are respectively arranged to engage upstanding trip members 80 and 81 which are formed as a part of a fixed frame 82. From the foregoing it will be apparent, if the gear 72 is turned in a clockwise direction through 180° that the pawl 73 will engage its ratchet 70 and likewise turn the shaft 65, but if the gear 72 is now returned to its initial position 180° in a counter-clockwise direction the pawl 74 will have been held out of engagement with its ratchet 71 and consequently the shaft 65 will not have been rotated.

By reference to Fig. 6 it will be apparent that, as the gear 72 is moved in the clockwise direction as described, the pawl 74 will also be carried with it and near the end of the movement the lug 77 of pawl 74 will engage the fixed cam or trip member 81 and thereby cause the pawl 74 to turn outwardly. In this position it does not engage the ratchet with which it normally co-operates so that when the counter-clockwise motion takes place this pawl 74 passes the ratchet tooth to leave it and the shaft 65 stationary while the gear returns to its normal position. At the end of this counter-clockwise motion the pawl 73 snaps back of a ratchet tooth of the ratchet 70 while the pawl 74 rides into abutting relation with respect to a tooth of the ratchet 71.

For controlling the movement of the freely movable gear 72 a rack bar 83 is provided which is engaged to slide in suitable bearings 84 and has one end projecting into a cylinder 85, where it terminates in a piston 86. This piston 86 is normally maintained in a neutral position within the cylinder 85 by means of springs 87 and 88 acting respectively against the piston and opposite ends of the cylinder 85. The motive fluid for moving the piston in one direction or the other has access to the cylinder 85 by way of pipes 90 and 91 which are connected respectively with opposite ends of the cylinder and are controlled in common by a rotary valve 92 having ports 93 and 94 which are arranged to communicate successively with the motive fluid inlet pipe 95. Thus in the position of the parts shown in Fig. 3 the rotary valve is in position to admit pressure fluid by way of port 94 and pipe 90 to the right hand end of cylinder 95, while the left hand end of the same cylinder is connected to the exhaust through pipes 91 and port 93.

For controlling the movement of the rotary valve 92 according to requirements a shaft 96 is fixedly secured to the rotary member of the valve and extends axially therefrom and fixedly secured thereto is a ratchet 97 which is arranged to be engaged by a spring controlled pivoted pawl 100 which is carried by a gear 101 loosely mounted upon the shaft 96 and operated by a rack bar 102. This rack bar 102 extends at one end into a fixed cylinder 103 where it terminates in a piston 104 which is normally held adjacent one end of the cylinder 103 by a coil spring 105. In order to move the piston 104 in the opposite direction against the pressure of the spring 105 a port 106 is provided in the end of the cylinder for the passage of motive fluid from the pipe 107 under the control of a reciprocable slide valve 108, the normal position of which is such as to connect the port 106 with an exhaust opening 110 and in which position it is held by a coil spring 111 acting against a suitable head 112 upon the valve 108. The valve 108 is moved to a position to establish communication between the port 106 and pipe 107 by means of a solenoid 113, the core 114 of which forms an extension of the valve 108. The pipe 107 is suitably connected to the main pressure fluid supply reservoir 25. The solenoid 113 may be controlled by a circuit in any well known form of radiant energy receiving system, but by way of example is here shown as included in a circuit 115 having a battery 116 and circuit closer 117, the latter being under the control of a relay 118 which is in a circuit 120 having a battery 121 and arranged to be controlled by a detector 122 from a closed oscillatory circuit 123 including a variable condenser 124 and a secondary coil 125. The coil 125 forms a secondary of a transformer having a primary coil 126 which is controlled by an electromagnetic vibrator 127 which is actuated by compressional waves receive upon a vibratory diaphragm 128, as described in copending applications S. N. 136,249, filed Dec. 11, 1916, and S. N. 241,330 filed June 22, 1918.

For controlling the main pressure fluid supply, to pipe 95 a fixed open ended cylinder 130 is suitably mounted adjacent the fixed cylinder 103 and preferably in alinement therewith and is provided with an inlet for motive fluid, by way of the pipe 131 which is formed as a branch of the pipe 107, and an outlet by way of the pipe 132. These pipes 131 and 132 enter the cylinder 130 at different points with respect to a long port 133 formed in a slide valve 134 which is arranged to control communication between the said pipes. In order to exhaust the pipe 132 at the proper time after the pressure fluid has been admitted thereto the valve 134 is provided with a second port 135 which communicates with an opening 136 through the end of the valve 134, so that when the parts are in the position shown in Fig. 3 the pipe 132 communicates with the atmosphere. This is the normal position of the valve 134 which is so maintained by means of a coil spring 137 bearing against the proper end of the valve 134 and encircling a connecting rod 140 which joins the valve member 134 to a piston 141 mounted for sliding movement in an auxiliary cylinder 142 fixedly mounted adjacent the cylinder 130 and preferably in alinement therewith. This cylinder 142 is provided with an opening 143 controlled by an outwardly opening flap valve 144 whereby the pressure in the cylinder 142 is relieved when the piston 140 moves to the right, as seen in Fig. 3. This cylinder structure is in the nature of a dash-pot for retarding the return movement of the piston 141 and includes an opening 145 which is controlled by an adjustable needle valve 146 to regulate the admission of air to the cylinder 142 when the piston 141 is moved to left, as seen in Fig. 3, under the action of the spring 137. The valve 134 is moved to its operative position to establish communication between the pipes 131 and 132, in the present instance, by the movement of the rack bar 102 under the influence of pressure admitted to the cylinder 103 back of the piston 104 and, as here shown, the valve 134 has a projecting stem 147 in the path of movement of the rack 102, and by which it is engaged to give the desired movement. Obviously any equivalent means may be employed to carry out the same movement.

In the present form of the invention the pipe 132 is placed in communication with the pipe 95 by way of an intermediate control wherein the aforesaid pipes are normally in free communication with each other so long as the auxiliary control mechanism, which will be later described, is not in operation, and it will therefore be evident that in some instances the suggested auxiliary control may be entirely dispensed with, in which case the pipe 132 will form a direct continuation of the pipe 95.

For the purpose of initially setting the angle of direction of movement of the torpedo the shaft 55 has rigidly secured thereto a gear 150, which meshes with a gear 151 which is mounted to slide on a sleeve 152, but is prevented from rotation on said sleeve by means of a key 153. The sleeve 152 is rigidly secured to a shaft 154 which is connected to an angle setting mechanism of any suitable type, (not shown), rotatable from the exterior of the moving body and operated before the body starts on its course. The gear 151 is moved from meshed position with the gear 150 to unmeshed position by means of a lever 155 pivoted at 156 to a fixed part of the body and which lever is arranged to be shifted by a fluid pressure motor consisting of a piston rod 157 connected to the lever 155 and connected to a piston 160 within a cylinder 161, to which pressure fluid may be admitted by way of the branch pipe 162, which is here in communication with the pipe 26. A valve 163 automatically controls the main pressure fluid reservoir 25 and when the torpedo or movable body is under way, this valve is open to supply the various pipes with the required motive fluid for operating purposes.

The operation of the system above described is as follows:—

Normally the torpedo or other movable body is controlled by the gyroscope 51 to maintain it on a predetermined course, which is set by means of the angle setting mechanism before the body starts upon its course. This is done by turning the shaft 154, which through the gears 150 and 151 rotates the worm 54 to move the cover top plate 41 to the desired angular position. When this angle setting mechanism is operated the clutch 64 will be disengaged from the parts connected to the shaft 55 because the piston 60 is influenced by the spring 63 and the air is cut off from the pipe 67, so that the angle setting mechanism can be freely rotated for the purpose intended. When the movable body starts upon its run the valve 163 is opened thereby allowing pressure fluid to enter the cylinder 57 to throw the clutch 64 into operative position, while at the same time the motive fluid passes into the cylinder 161 and shifts the piston 160, so that the gear 151 is disengaged from the gear 150 and the movable body therefore placed under the control of the gyroscope mechanism for automatically maintaining the predetermined course and under the control of the mechanism which is operable at will from a distance.

If it is desired to change the course of the movable body through a predetermined number of degrees, say to the left, a radio-sonic impulse is sent from a distant station which energizes the solenoid 113 through the receiving mechanism, so that the valve 108 is moved to admit pressure from pipe 107 and pipe 106 to the cylinder 103, thus causing the piston 104 to move to the right, as seen in Fig. 3, and moving the rack 102 in the same direction, whereby both the rotary valve 92 and the slide valve 134 are simultaneously moved to new positions respectively. The valve 92 will be turned one-half a revolution in a clockwise direction by the engagement of the pawl 100 with the ratchet 97 and the rotary member of the valve will have assumed the position shown in Fig. 8. At the same time the valve 134 will be moved to the position shown in Fig. 9 but the pressure fluid pipes 131 and 132 will still be out of communication and the supply still cut off to the control valve 92. At the end of the impulse the solenoid 113 will be deenergized so that the rack 102 will return automatically to its original position under the action of the spring 105, thereby leaving the slide valve 134 free to be returned under the action of the spring 137, but regulated by the retarding action of the dash-pot 142. When the valve 134 reaches the point where the pipe 131 is uncovered the motive fluid has free access by way of the port 133, the pipes 132 and 95, the rotary valve port 94 and the pipe 91 to the left hand end of cylinder 85, and this flow of motive fluid will continue until the valve 134 returns to its normal cut off position with the pipe 132 in communication with the exhaust 136. It will thus be evident after the radiosonic impulse has ceased that a certain predetermined period of time will elapse before the motive fluid is admitted to the rotary valve inlet pipe 95 and it will only be admitted to this pipe then for another certain period before the supply is cut off and the valve 134 again resumes its normal position. By this construction the rotary valve 92 may be put in either of its control positions by sending either one or two impulses before the slide valve 134 has moved to its operative position through delayed action of the retarding device. In the present example with the motive fluid entering the left hand end of cylinder 85, the piston 86 will move to the right and through the rack 83 turn the gear 72 through one half a revolution in a clockwise direction, and thus by means of the pawl 73 and ratchet 70 turn the shaft 65 through a one half revolution. As soon as the cylinder 85 is open to the exhaust, the piston 86 returns under the action of the spring 87, thereby turning the gear 72 counter-clockwise one half a revolution, but the shaft 65 will remain stationary due to the fact that the pawl 74 is held out of engagement with its ratchet 71 because the lug 77, in this direction of movement, strikes the trip 81 to prevent operation of the ratchet 71. The rotation of the shaft 65 is transmitted through the friction clutch 64 to the shaft 55 and the worm 54 thereupon rotates one half a revolution in a clockwise direction and transmits motion to the cover plate 41 so that it in turn moves a predetermined number of degrees in a clockwise direction. The plate 41 in its movement carries the arm 43 with it so that the bifurcated plate 44 is moved in a clockwise direction because it is in engagement with the disc 46 which is fixed in space by the gyroscope 51. The operation then is the same as previously described for the automatic control, namely the valve 23 is shifted to admit pressure to the right hand end of the cylinder 20, thus causing the piston 17 to move and shift the rudder 11 in a clockwise direction, so that the movable body is directed to the left until it has moved through the same number of degrees that the cover plate 41 has been moved. When it has reached this position the bifurcated plate 44 has come into a neutral position with respect to the dog 45 and the movable body will then proceed upon the new course as required.

For directing the moving body to the right the general sequence of operation is the same, excepting of course that corresponding parts to those above described come into action for giving the required direction.

Referring to Fig. 10, another form of the present invention is shown wherein certain of the parts already described are included as a part of the modified construction, so that to these corresponding parts the same reference numerals will be applied as used in connection with the form shown in Fig. 3. In this form the connecting rod 30 of the valve 23 which controls the fluid motor for operating the rudder 11 is connected to a crank arm 170 which is rigidly secured to the spindle 43 and operated thereby as the latter is turned under the action of the bifurcated plate 44. In this construction the disc 46 is loosely mounted on the trunnion 47 so that it may turn relative thereto and has a gear segment 171 formed on its periphery which is normally in mesh with a sleeve pinion 172 loosely mounted upon a shaft 173. This sleeve pinion 172 is also in mesh with a gear 174 rigid with the trunnion 47 and thus held fixed in space by the action of the gyroscope 51.

In order to disconnect the disc 46 from the gear 174 for the purpose of distant control the shaft 173 carries a gear 175 fast thereon to rotate therewith and also a bevel gear 176 which is suitably keyed thereon but the construction is such as to permit the shaft 173 to move axially relative to the gear 176. The shaft 173 terminates in a piston 177 enclosed within a cylinder 180 and arranged to be moved in one direction by pressure fluid admitted by a pipe 181 and to be moved in the opposite direction by a spring 182.

For the purpose of rotating the shaft 173 the bevel gear 176 is in mesh with a bevel gear 183 rigid with a shaft 184 which is suitably journalled and has fixed thereto a pair of ratchets 185 and 186 which are arranged to be actuated respectively by spring pressed pawls 187 and 188 so that the shaft 184 may be turned in either direction as desired. The pawl 187 is pivotally mounted upon side of a gear 190 which is loosely mounted upon the shaft 184, while the pawl 188 is similarly mounted upon one side of a gear 191 also loosely mounted upon the shaft 184. To release either pawl from its ratchet so that the shaft 184 can be turned in opposite directions, a pair of fixed trip arms 192 and 193 are provided one of which, 192, is in the path of the free end of the pawl 187 and the other, 193, is in the path of the free end of the pawl 188. The trip arms 192 and 193 serve to lift one or the other of the pawls 187 and 188 according to the reverse directions of movement of the gear 190. The gears 190 and 191 are respectively rotated by rack bars 194 and

195, the former being at the opposite side of the shaft 184 from the latter so that one gear is rotated in one direction and the other gear in the other direction according to which rack bar is shifted. The rack bar 194 terminates in a piston 196 enclosed and slidably mounted within a cylinder 197 so that pressure fluid supplied by the pipe 191 will move the piston 196 in one direction and a spring 198 will return it to normal position. The rack bar 195 similarly carries a piston 200 mounted for movement within a cylinder 201 and movable in one direction by pressure fluid supplied by the pipe 90 and returned to normal position by a spring 202.

For automatically controlling the admission of motive fluid to the pipes 90, 91 and 181 a valve is provided comprising a fixed casing 203 having a piston valve 204 mounted to slide therein for the purpose of cutting off and establishing communication between the pressure fluid supply pipe 131 and a branch pipe 205 which communicates with the pipes 95 and 181. The valve 204 is normally held in closed position by a spring 206 while movement in the opposite direction is accomplished through the medium of a pivoted trip arm 207 which is held against the end of the valve 204 by a spring 208 and has its other end in the path of a trigger 210 fixed to a bar 211 formed as a part of the dash pot rod 140. Suitable springs 212 are respectively coiled on rods 213 and act at one end against a fixed part of the cylinder 142 and at the other end against the movable bar 211. This bar 211 is arranged in the path of movement of the rack bar 102 to be positively driven in one direction while its return movement is a delayed one brought about by the dash pot connection to the springs 212.

For controlling the circuit of the solenoid 113 a time switch 214 is employed, the same being actuated by pressure fluid admitted to a cylinder 215 and operating to shift a piston 216 which is connected to the switch 214 proper. A dash pot construction 217 is arranged upon the cylinder 215 to retard the closing action of the switch 214 a predetermined length of time after the pressure fluid has been admitted to the pipe 107. A spring 218 operates to return the piston 216 to its normal position and opens the switch 214.

The operation of the form of the invention shown in Fig. 10 is as follows:—When the moving body starts upon its course the valve 163 is opened thereby releasing the pressure fluid to the several controlling devices and causing the switch 214 to close one break in the circuit 115 after a predetermined length of time. Normally the moving body is automatically maintained upon its course by the action of the gyroscope 51 which operates to maintain the gear 174 and disc 46 fixed in space, since these two members are directly coupled under this condition by the pinion 172. If the body should deviate, say to the right from the prescribed course the bifurcated member 44, which is subject to the movement of the body, will contact with the dog 45 of the disc 46 and as this latter is fixed in space by the gyroscope 51, the member 44 will be swung in a clockwise direction. This movement will be transmitted through the spindle 43 and lever 170 to the valve 23 which is thereupon drawn to the right, as seen in Fig. 10, to admit pressure fluid to that end of the cylinder 20 to cause the piston 17 to move in the direction necessary to shift the rudder 11 in a clockwise direction to return the body to its predetermined course. Should the moving body deviate to the left the parts operate in a similar manner but in the opposite direction so that the rudder 11 is turned in a counter-clockwise direction as will be understood.

For controlling the direction of the moving body at will from a distance the radiant energy controlled mechanism is brought into operation in the following manner. Should it be desired, for example, to steer the moving body through a predetermined number of degrees to the left, and assuming the valve 92 is in a position which would result in a movement of the body to the right, a radiosonic impulse is sent which, through the receiving circuits, causes the solenoid 113 to be energized thereby shifting the valve 92 to a position to admit pressure to the cylinder 103 and move the rack bar 102 to the right as seen in Fig. 10. This simultaneously turns the ratchet 97 through half a revolution and moves the piston 141 to the right hand end of the cylinder 142 without disturbing the position of the pressure fluid control valve 204. The movement of the ratchet 97 causes the rotary valve 92 to take a position with the pipes 91 and 95 in communication.

At the end of the impulse the rack bar 102 will be restored to its original position promptly but the piston 141 will return slowly, under the combined action of the springs 212 and the dash-pot 142. Hence a definite period will elapse before the trip 210 strikes the arm 207 and causes it to move in the direction necessary to open the valve 204 so that pressure fluid passes from pipe 131 to the distributing pipe 205. When this occurs the pipe 181 conveys the pressure fluid to the cylinder 180 and the piston 177 is moved in the required direction to shift the pinion 172 out of mesh with gear segment 171 but still in mesh with the gear 174, while the gear 175 is brought into mesh with the gear segment 171. The parts are now in position to be set as required for the desired direction of movement. This action takes place by the pressure fluid traversing the pipe 91 and moving the piston 196 so that the gear 190 is turned three quarters of a revolution in a counter-clockwise direction, thus, through the ratchet 185 rotating the shaft 184 through half a revolution in a counter-clockwise direction. This motion is transmitted through the bevel gears 183 and 176 and gear 175 to the disc 46 which is then turned in a counter-clockwise direction through a predetermined number of degrees. The pinion 172, being free upon the shaft 173, remains idle and in mesh with the gear 174 which is fixed in space. The movement of the disc 46 turns the member 44 in a clockwise direction thereby bringing the valve 23 to a position to admit pressure fluid to the cylinder 20 at the proper end to move the piston 17 in a direction to swing the rudder 11 in a clockwise direction to steer the body to the left.

When the trip 210 moves out of engagement with the arm 207, the valve 204 automatically cuts off the pipe 205 from the supply of pressure fluid and the cylinders 180 and 197 are opened to the exhaust. This allows the piston 177 to return to normal position, under the influence of the spring 182, and bringing with it the gear 175 and pinion 172, the former being unmeshed from segment 171 and the latter again meshing with both the segment 171 and the gear 174. Also the piston 196 is returned to normal position by the spring 198 but the shaft 184 remains stationary. The disc 46 is therefore again held fixed in space and under the control of the gyroscope 51 but moved through a predetermined number of degrees with respect to its former position. When the body has moved to the left through the predetermined number of degrees the gyroscope 51 is again in control and automatically maintains the new direction.

If it is now desired to change the direction again and in the opposite direction, that is to the right, through a predetermined number of degrees, a radiosonic impulse is sent to energize the solenoid 113 and cause the rack bar 102 to turn the rotary valve 92 through half a revolution, that is from the position shown in Fig. 11 to that of Fig. 12 thus bringing the pipes 90 and 95 into communication. Thereafter the valve 204, under the delayed action of the retarding mechanism, comes into position to admit pressure fluid from pipe 131 to pipe 95 with the result that pressure this time enters the cylinder 201 and also the cylinder 180 and such a sequence of operations takes place, as already explained, as to shift the rudder 11 in a counter-clockwise direction to direct the moving body to the right a predetermined number of degrees.
In case it should be desired to again cause another change of direction to the right it will be evident that the valve 92 must rotate one complete revolution before again being in position to give the necessary direction, and to do this two closely spaced radiosonic impulses are sent the first of which turns the valve 92 through one half a revolution and the second through the other half revolution. This action takes place before the trip 210 has reached the arm 207 upon the return stroke caused by the first impulse and the retarding mechanism is adjusted with the view to giving such delayed action and allowing a predetermined period before opening the control valve 204 so that the valve 92 may have assumed its correct position.

In Fig. 14 a modified form of the pressure fluid control is shown wherein the retarding mechanism and its associated parts are omitted and the pressure supply pipe 95 to the rotary valve 92 is in communication with the cylinder 103 at a point relatively near the end of the stroke of the piston 104 so that when the latter is moved to the right, as seen in Fig. 14 to the end of the cylinder this pipe 95 will receive pressure fluid from the supply pipe 107. In this form of the invention either a long impulse or both short and long impulses are necessary to set the rotary valve 92 in the desired position. Thus in the position of the valve 92 shown in Fig. 14 if it is desired to steer the moving body to the left a long impulse is sent which causes the piston 104 to move to the right and remain there until the end of the impulse. This rotates the valve 92 through half a revolution to the position shown in Fig. 11 and the pressure fluid passes by way of the pipe 95, valve 92 and pipe 91 to operate the rudder control mechanisms as heretofore explained.

If, however, with the valve 92 in the position shown in Fig. 14, it is desired to steer the body to the right, instead of to the left as just described, a short impulse is sent which is followed by a long one. The short impulse is sufficient to turn the valve 92 through a half revolution but the movement of the piston 104 is too quick to allow enough pressure fluid to pass to the valve 92 to operate the required mechanisms. The following long impulse rotates the valve 92 through another half revolution to its original position shown in Figs. 12 and 14 and the pressure fluid then has free access to the rudder control mechanism which operates as described to shift the rudder in the required direction.

Referring now more particularly to Figures 22 and 23 of the drawings one form of the present invention for controlling the direction of movement of the moving body about a horizontal axis is shown wherein a rudder 220, preferably of the two blade type, is employed and rigidly mounted for movement with a horizontal rudder post 221, which is connected to a yoke 222 arranged to be shifted as desired by an operating lever 223 pivotally secured to a piston rod 224.

For the purpose of swinging the rudder 220 to a desired position to cause the movable body to be directed as required, the rod 224 is secured to a piston 225 which is mounted for reciprocating movement in a cylinder 226. The ends of the cylinder 226 are provided with ports 227 and 228 which are controlled by a slide valve 230 operating in a chest 231 which is in communication with the pressure fluid reservoir 25, or any other source, by way of a pipe 232. The respective ends of the cylinder 226 exhaust by way of the open ends of the chest 231 when the valve 230 has moved to full open position in either direction.

For actuating the slide valve 230 and also for maintaining it in a position to cause the movable body or torpedo to move about a horizontal axis whereby its submergence is maintained or varied in a predetermined manner a rod 233 is fixed at one end to the slide valve 230 and at the other end has pivotal connection with a link 234 which is pivoted to one end of a lever 235. The opposite end of the lever 235 is connected by a rod 236 with a pendulum bar 237 which is suspended for free swinging movement from a fixed pivot 238 and carries a suitable weight 239. The lever 235 is fulcrumed intermediate its ends upon a pin 241 which is rigid with an arm 242 arranged to project through the hull or body 10 to which it is pivoted at 243. The projecting end of this lever 242 is provided with a slot 244 arranged to receive a pin 245 which is rigid with a lug 246 of a diaphragm 247. This diaphragm 247 is positioned within a chamber 248, open at one side to the pressure of the water in which the body is moving and is connected to the body proper by flexible strips 250. The opposite side of the diaphragm 247 has a bifurcated lug 251 rigid therewith which forms a support for a link 252 the ends of which are suitably connected to followers 253 respectively. These followers 253 form closures for and are located at one end of each of two cylinders 254 and are respectively subject to the pressure of springs 255.

The means for adjusting each spring 255 is preferably the same and consists of a second follower 256 seating on the end of the spring 255 but fixed in any suitable manner against rotation in the cylinder 254 and screwed upon the threaded end 257 of a rod 258 which extends outside of the cylinder 254 and terminates in a tubular head 260 which is arranged to form a coupling between the rod 258 and a shaft 261. The connection of these parts is such that the head 260 can slide longitudinally of the shaft 261 but rotates therewith when the said shaft 261 is rotated. Since there are two projecting rods 258 there are likewise two heads 260 and two shafts 261, these latter being connected to gears 262 respectively of a setting mechanism 263 by which the spring tension is adjusted prior to starting the body upon its run.

For varying the depth of the body while moving and maintaining it at the new depth level the heads 260 are both located in the path of movement of a relatively long lever 264 which is pivoted at 265 to a fixed part of the body and arranged to pass above the heads 260 so that if lowered it will engage the heads 260 and thus increase the pressure of the springs 255. The free end of this lever 264 is pivotally secured to a piston rod 266 which passes into a cylinder 267 where it terminates in a piston 268, the movement of which, in a direction to compress the springs 255, is controlled by pressure fluid admitted by way of a pipe 270. When the lever 264 has been moved to increase the spring pressure it is held in the new position by a spring catch 271 riding over a lip 272 upon the end portion of the lever 264.

In order to control the admission of pressure fluid to the pipe 270 at will from a distance the inlet end of this pipe 270 communicates with a valve casing 273 (Fig. 3) having a reciprocable valve member 274 provided with ports 275 and 276 which serve respectively to control the flow of pressure fluid from a supply pipe 277 to the pipe 270 and from the pipe 132 to the pipe 95. These latter pipes 132 and 95 are in the direction control system for movement about a vertical axis and the valve 274 is normally in position to establish communication between them and to cut off communication between the pipe 270 and the pipe 277. The pipe 270 exhausts through the open end of the cylinder 273.

For shifting the valve 274 as required it has a rod 280 rigidly connected to it and extending into a dash-pot cylinder 281 where it terminates in a piston 282 arranged to be moved in one direction by pressure fluid admitted to an adjacent cylinder 283 and acting against a piston 284 which is rigidly connected to the piston 282 by a rod 285. The piston 282 is moved in the opposite direction by a spring 286 acting against the movable piston 284 and the fixed cylinder 281. The dash-pot cylinder 281 is provided with ducts 287 each connecting with the cylinder 281 at opposite sides of the piston 282 and each having an adjustable needle valve 288 and a check valve 289 for the purpose of regulating the flow of air from one end of the cylinder to the other whereby the movement of the piston 282 may be retarded and timed in the desired manner.

To admit and control the pressure fluid to the cylinder 283, a pipe 291 is provided having free communication with the cylinder 283 at one end and with the cylinder 103 at the other end though on the opposite side of the piston 104 from the pressure fluid supply port 106. The arrangement is such that the piston 104 must move a considerable portion of its stroke before uncovering the pipe 291 to a flow of pressure fluid and consequently it is possible to operate the two rudder control systems by a common mechanism, the one responding to a short impulse and the other to a relatively long impulse. It will be understood, however, that the invention is not restricted to a common control means for selectively operating one or the other system as obviously both may be controlled by a separate impulse receiving system.

As a modification of the common control for both systems there is a form shown in Figs. 17 to 21 wherein the rotary valve 92 is arranged to control not only the pressure fluid pipes 90 and 91 to the vertical rudder control but also the pipe 270 to the horizontal rudder control. This is accomplished by the provision of a three-toothed ratchet 292 under the control of the spring pressed pawl 100 of the gear 101 and the stroke of the piston 104 is such that the rotary valve shaft 96 turns one-third of a revolution at each movement of the rack bar 102. The rotary valve 92 may therefore be selectively placed by sending one or more impulses as required to bring it to the desired position.

The operation of the depth control system above described is as follows: Before the start of the run the depth mechanism is adjusted to the depth at which the moving body is to proceed for the first part of its run. This is done by turning the gears 262 which can be done from the outside of the torpedo by means of suitable wrench, so that the threaded rods 257 will be rotated and the followers 256 moved to place the springs 255 under the required compression for the desired depth. Thus the diaphragm 249 is subject to the spring pressure on one side and to the water pressure on the other and when these two pressures are equal the mechanism will be as shown in Fig. 23.

If, now, under running conditions the moving body should tend to go deeper than the predetermined depth the increased pressure of the water will force the diaphragm 247 inward against the action of the springs 255, thereby turning the lever arm 242 in a clockwise direction. Since the lever 235 is held fixed by the pendulum 239 the fulcrum 241 will be shifted to the right, as seen in Fig. 23, thus turning the lever 235 in a clockwise direction and causing the valve 230 to move to a position to allow pressure fluid to pass from the reservoir 25, by way of pipe 232 to the right hand end of the cylinder 226 and shift the piston 225 to the left. This movement is transmitted to the horizontal rudder 220 which then swings in a counter-clockwise direction to bring the body back to the predetermined depth.

In case the moving body tends to rise above the predetermined depth the reverse of the foregoing operation will take place, resulting in the horizontal rudder 220 being turned in a clockwise direction to return the body to the predetermined depth.

The pendulum 239 operates to restore conditions in case of a sudden tipping of the moving body about a transverse horizontal axis. Thus, should the body, for example, tip down at its bow end, the pendulum 239 will swing in a clockwise direction and move the slide valve 230 to the right to operate the rudder 220 in a counter-clockwise direction to bring the body back upon an even keel. The reverse action takes place if the body suddenly tips in the opposite direction.

When it is desired to change the depth from a distance while the body is running, a long impulse is sent and causes the solenoid 113 to be energized so that pressure fluid enters the cylinder 103 and holds the piston 104 at the end of its stroke for a definite length of time. Fluid pressure, therefore, enters the pipe 291 and forces the piston 284 outward against the action of the spring 286 and the dash-pot 281, so that the valve 274 moves slowly to the right cutting off the communication between the pipes 95 and 132 and establishing communication between the supply pipe 277 and the pipe 270. The pressure fluid now has a free passage to the cylinder 267 and the piston 268 is shifted so that the arm 264 is drawn to the locked position indicated in dotted lines, Fig. 22. The arm 264 in its movement forces the heads 260 in a direction to further compress the springs 255 and thus move the diaphragm 247 outward against the pressure of the water. This movement of the diaphragm 247 is transmitted to the lever arm 242 which is rocked in a counter-clockwise direction thereby placing the slide valve 230 in position to admit pressure fluid to the left end of the cylinder 226 necessary to cause the horizontal rudder 220 to move in a clockwise direction. This causes the moving body to dive and it will continue to do so until the pressure of the water on the diaphragm 249 equals the new pressure of the springs 255, whereupon the mechanism adjusts itself and proceeds upon an even keel at the new depth under the action of the depth regulating means. When the impulse stops, the piston 104 is returned to its initial position and the pressure fluid from the cylinder 283 exhausts and the valve rod 280 returns slowly to initial position under the action of the spring 286 and the regulation imposed by the dash-pot 281. This return action is so timed with respect to the main control valve 134 that the latter has reached its normal closed position before the pipes 95 and 132 are again placed in communication by the return action of the slide valve 274. If this contingency was not provided for pressure fluid would have access to the rotary valve 92 and operate the direction control system for the vertical axis control when it was not intended to be operated.

Referring now to Fig. 24, another form of depth control mechanism is shown wherein the piston rod 266 extends from the cylinder 267 in the form of a rack 300 which is in mesh with an elongated pinion 301 having internal right and left hand threaded portions to receive respectively the threaded ends of two rods 302 and 303 which are respectively mounted in fixed bearings 304 and 305 in such a manner that each is free to move longitudinally with respect to its bearing, but cannot rotate therein. The rod 302 is suitably connected by a pin and slot joint 306 to the free end of the lever 235 so that its movement may be properly transmitted to the rudder control valve 230. The rod 303 is connected to the pendulum arm 237 by a pin and slot joint 307 or any other suitable connection for the purpose. This arrangement of the pinion 301 mechanism is in the nature of a turnbuckle so that when the pinion 301 is rotated in one direction the rods 302 and 303 will be drawn together and when rotated in the opposite direction the rods 302 and 303 will be forced apart.

In the operation of this form of the invention pressure fluid is admitted to the pipe 270, as previously described, when it is desired to change the depth, and the piston 268 will be moved in a direction to rotate the pinion 301 so that the rods 302 and 303 are moved apart, thereby swinging the lever 235 counter-clockwise and drawing the valve 230 to the left. Pressure fluid now has access to the left end of the cylinder 226 and entering shifts the piston 225 to the right to cause the rudder 220 to move in a clockwise direction. The moving body is thus caused to dive and as it goes down the follower 253 will be moved against the compression of the spring 255 and the arm 242 will be rocked in a clockwise direction and restore the valve 230 to its initial position, through the action of the lever 235, the fulcrum of which moves with the said arm 242. At the new depth the moving body will proceed upon an even keel.

Referring to Fig. 25, another modification of the depth control mechanism is shown wherein the elongated pinion 301 mechanism of the form shown in Fig. 24 is interposed between the slide valve 230 and the lever 235 and it is believed to be unnecessary to repeat the general details of the construction since they should be readily understood.

The operation of this form of the invention is substantially the same as that already recited. When the pressure fluid is admitted to the cylinder 267 from the pipe 270 the rack 300 moves to rotate the pinion 301 as before, but in this instance the rods 302 and 303 are reversed as to the screw threads so that the rotation of the pinion 301 draws them together in order to move the valve 230 to the left and admit pressure fluid to the cylinder 226 at the proper end to cause the rudder 220 to be swung in a clockwise direction to cause the body to dive.

As the pressure of the water increases the follower 253 will be moved against the pressure of the spring 255 and the arm 242 consequently rocked in a clockwise direction and carrying with it the lever 235. When the fulcrum 241 has moved a sufficient distance to the right to cause the valve 230 to assume its normal neutral position the body will have reached the new depth and then proceed upon an even keel.

In Fig. 26 another form of depth control is shown wherein the cylinder 267 is rigidly secured to the arm 242 and has its projecting piston rod 266 secured to one end of a bell crank 310 by a pin and slot connection 311. The bell crank 310 is pivoted at 312 to the arm 242 and has its other end pivoted to the fulcrum 241 of the lever 235.

When pressure fluid is admitted to the pipe 270 which in this is flexible the piston 268 will be moved to shift the bell crank 310 in a counter-clockwise direction and the fulcrum 241 will be moved to the left, thereby shifting the valve 230 to the left also and admitting pressure fluid to the cylinder 226 at the end necessary to cause the piston 225 to move and swing the rudder 220 in a clockwise direction to make the body dive. Now as the water pressure increases, the follower 253 is moved inward against the spring 255 and simultaneously rocking the arm 242 in a clockwise direction. As the arm 242 moves it carries the fulcrum 241 to the right and causes the lever 235 to move the slide valve 230 back to central position whereupon the body will proceed upon an even keel at the new depth.

From the foregoing it will be apparent that a complete unitary system has been provided, whereby a moving body when once set upon a predetermined course is thereafter automatically maintained on that course until such time as it is the will of the operator to direct it otherwise, also whereby a moving body can be controlled, as to its turning movement about a vertical axis, from a distance at will, thus temporarily relieving the automatic control. Further the system provides for varying the depth of submergence of the moving body at will and for automatically maintaining the moving body at a predetermined depth. In connection with the receiving mechanism which is responsive to radiant energy it should be understood that this is initially set to respond to a predetermined frequency in order to avoid interference from radiant energy transmitted from sources other than the proper control station.

Having thus described our invention, we claim:

1. In a marine vessel, the combination of a rudder, pressure fluid means for operating said rudder, a control valve for said means, gyroscope controlled means for operating said control valve, means to initially set said gyroscope controlled means to cause said vessel to travel a predetermined course, means operable at will from a distance for changing the set condition of said gyroscope controlled means to cause said vessel to travel another predetermined course, and means to release said initial setting means when the vessel is in motion.

2. In a marine vessel, the combination of a rudder, operating means for said rudder, means for respectively moving said operating means to shift said rudder in a clockwise and a counter-clockwise direction, pressure fluid devices for operating said moving means, a source of pressure fluid, a valve for controlling the flow of pressure fluid to both of said moving means, radiant energy controlled means for moving said valve to a position to operate a predetermined one of said moving means, and means to delay the flow of pressure fluid to said valve for a predetermined interval.

3. In a marine vessel, the combination of a rudder arranged to control the movement of a vessel about a horizontal axis, a diaphragm exposed on one side of the pressure of the surrounding water, spring means acting against the opposite side of said diaphragm to counteract said water pressure, means for operating said rudder, means operated by the movement of said diaphragm for actuating said rudder operating means, a lever connected to said actuating means, and means operated by radiant energy for shifting said lever to cause said actuating means to move said rudder operating means to a predetermined operative position.

4. A system for controlling a dirigible body, comprising means for causing said body to be moved away from a given horizontal plane, means controlled by variations of pressure in the fluid medium through which said body may be moving for controlling said first mentioned means, and means responsive to radiant energy for controlling said second mentioned means.

5. A system for controlling a dirigible body, comprising in combination, a rudder arranged to oscillate about a normally substantially horizontal axis, means responsive to variations in the pressure of the fluid medium through which said body may be moving for controlling said rudder and means arranged to be controlled from a distance for controlling said pressure responsive means.

6. The combination with a dirigible submarine body, an element carried thereby and arranged to oscillate with respect thereto to control the depth of submergence of said body, means responsive to variations in the pressure of surrounding water for controlling said first mentioned means, and means responsive to radiant energy for varying the operation of said second mentioned means to vary the depth of submergence of said body at will.

7. The combination with a dirigible submarine body, an element carried thereby and arranged to oscillate with respect thereto to control the depth of submergence of said body, means responsive to variations in the pressure of surrounding water for controlling said first mentioned means, and means responsive to radiant energy for varying the operation of said second mentioned means to increase the depth of submergence of said body at will.

8. A system for controlling the vertical movement of a dirigible body comprising an element carried by said body and arranged to be vibrated in response to and in accordance with variations in the pressure of the fluid medium through which said body may be moving, a second element carried by said body and arranged to be oscillated with respect thereto about an axis normally fixed with respect to said body but movable with respect thereto, and means responsive to radiant energy for changing the position of said axis with respect to said body to cause a vertical variation in the position of said body.

9. A system for controlling the vertical movement of a dirigible body, comprising an element carried by said body and arranged to be vibrated in response to and in accordance with variations in the pressure of the fluid medium through which said body may be moving, a second element carried by said body and arranged to be oscillated with respect thereto about an axis normally fixed with respect to said body but movable with respect thereto, and fluid actuated means responsive to radiant energy for changing the position of said axis with respect to said body to cause a vertical variation in the position of said body.

10. The combination with a dirigible body, of means carried thereby for steering said body laterally, means carried by said body and arranged to be controlled by variations in the pressure of the surrounding fluid medium through which said body may be travelling for steering said body vertically, and an element responsive to radiant energy and operative to control selectively said first mentioned means and to vary the operation of said second mentioned means.

11. The combination with a dirigible body, of means carried thereby for steering said body laterally, means carried by said body and arranged to be controlled by variations in the pressure of the surrounding fluid medium through which said body may be travelling for steering said body vertically, and an element responsive to radiant energy and operative to control selectively said first mentioned means and to vary the operation of said second mentioned means, said element being in the form of a fluid distributing valve.

12. The combination with a dirigible body, of means carried thereby for steering said body laterally, means carried by said body and arranged to be controlled by variations in the pressure of the surrounding fluid medium through which said body may be travelling for steering said body vertically, and an element responsive to radiant energy and operative to control selectively said first mentioned means and said second mentioned means, said element being in the form of a fluid distributing valve, rotatable step by step in a single direction through 180° at each step in response to successive impulses of radiant energy.

13. The combination with a dirigible body, of means carried thereby for steering said body laterally, means carried by said body and arranged to be controlled by variations in the pressure of the surrounding fluid medium through which said body may be travelling for steering said body vertically, and an element responsive to radiant energy and operative to control selectively said first mentioned means and said second mentioned means, said element being in the form of a distributing valve, rotatable step by step in a single direction through 180° at each step in response to successive impulses of radiant energy, and said element being operative to steer said body laterally when in a substantially horizontal plane either to the right or to the left, or to cause said body to move away from a given horizontal plane.

14. The combination with a dirigible body, of means carried thereby for steering said body laterally, means carried by said body and arranged to be controlled by variations in the pressure of the surrounding fluid medium through which said body may be travelling for steering said body vertically, and an element responsive to radiant energy and operative to control selectively said first mentioned means and said second mentioned means, said element being in the form of a distributing valve rotatable step by step in a single direction through 180° at each step in response to successive impulses of radiant energy, and said element being operative to steer said body laterally when in a substantially horizontal plane either to the right or to the left, or to cause said body to move downwardly away from a given horizontal plane.

15. The combination with a dirigible body, of means carried thereby for steering said body laterally, means carried by said body and arranged to be controlled by variations in the pressure of the surrounding fluid medium through which said body may be travelling for steering said body vertically, and an element responsive to radiant energy and operative to control selectively said first mentioned means and said second mentioned means, said element being in the form of a distributing valve rotatable step by step in a single direction through 180° at each step in response to successive impulses of radiant energy, and said element being operative to steer said body laterally when in a substantially horizontal plane either to the right or to the left, or to cause said body to move downwardly away from a given horizontal plane, said means for steering said body laterally including stabilizing means, and said means for steering said body vertically also including stabilizing means.

16. The combination with a dirigible body, of means carried thereby for steering said body laterally, means carried by said body and arranged to be controlled by variations in the pressure of the surrounding fluid medium through which said body may be travelling for steering said body vertically, and an element responsive to radiant energy and operative to control selectively said first mentioned means and said second mentioned means, said element being in the form of a distributing valve rotatable step by step in a single direction through 180° at each step in response to successive impulses of radiant energy, and said element being operative to steer said body laterally when in a substantially horizontal plane either to the right or to the left, or to cause said body to move downwardly away from a given horizontal plane, said means for steering said body laterally including gyroscopic stabilizing means, and said means for steering said body vertically including a pendulum.

17. The combination with a dirigible body, of a rudder arranged to control the movement of said body about a horizontal axis, a yielding element carried by said body and arranged to be varied in position in response to variations in pressure of the fluid medium through which said body may be moving, a lever controlled by said yielding element carried by said body and arranged to be oscillated with respect thereto about an axis normally fixed with respect to said body but movable with respect thereto, means controlled by said lever for actuating said rudder, and means responsive to radiant energy for varying the position of said rudder with respect to said body.

18. In a marine vessel, the combination of means for varying the direction of said vessel about a vertical axis, means for varying the direction of said vessel about a horizontal axis, a stabilizer, means actuated by said stabilizer for controlling said first mentioned direction varying means, means to initially set said stabilizing actuated means to cause said vessel to travel a predetermined course, means operable at will from a distance for changing the said condition of said stabilizer actuated means to cause said vessel to control another predetermined course and means to release said initial setting means when the vessel is in motion.

19. In a marine vessel, the combination of means for varying the direction of said vessel about a vertical axis, means for varying the direction of said vessel about a horizontal axis, a stabilizer, means actuated by said stabilizer for controlling said first mentioned direction varying means, means to initially set said stabilizing actuated means to cause said vessel to travel a predetermined course, means for selectively controlling said direction varying means, means operable from a distance for actuating said selective means to cause said vessel to travel in a predetermined course, and means to release said initial setting means when the vessel is in motion.

20. In a vessel adapted to float in a natural medium, the combination of means for varying the direction of movement of said vessel through said medium, a stabilizer, means actuated by said stabilizer for controlling said direction varying means, means to initially set said stabilizer controlled means to cause said vessel to control a predetermined course through said natural medium, means controlled by compressional waves in said medium for changing the set condition of said stabilizer actuated means to cause said vessel to travel in a predetermined course, and means to release said initial setting means when the vessel is in motion.

21. In combination, a vessel adapted to float in a natural medium, means called into action on change in heading of said vessel for restoring it to a predetermined heading, means to initially set said direction restoring means to cause said vessel to travel a predetermined course, means operable at will from a distance for changing the set condition of said initially set means to cause said vessel to travel in a predetermined course, and means to release said initially setting means when the vessel is in motion.

22. In combination, a self-stabilizing, self-steering vessel, means arranged to be initially set in advance of the movement of said vessel to cause said vessel to travel a predetermined course, means operable at will from a distance for changing the set condition of said first named means to cause said vessel to travel in a predetermined course, and means to release said initial setting means when the vessel is in motion.

23. In a marine vessel, the combination of means for varying the direction of said vessel about a vertical axis, means for varying the direction of said vessel about a horizontal axis, a stabilizer, means actuated by said stabilizer for controlling said first mentioned direction varying means, means to initially set said stabilizing actuated means to cause said vessel to travel a predetermined coarse, said vessel to travel a predetermined coarse, said vessel to travel a predetermined coarse, means operable at will from a distance and including a tuned circuit for changing the said condition of said stabilizer actuated means to cause said vessel to control another predetermined course and means to release said initial setting means when the vessel is in motion.

24. In a marine vessel, the combination of means for varying the direction of said vessel about a vertical axis, means for varying the direction of said vessel about a horizontal axis, a gyroscope, means actuated by said gyroscope for controlling said first mentioned direction varying means, means to initially set said gyroscope actuated means to cause said vessel to travel a predetermined course, means for selectively controlling said direction varying means, means operable from a distance for actuating said selective means to cause said vessel to travel in a predetermined course, and means to release said initial setting means when the vessel is in motion.

25. In combination, a self-stabilizing, self-steering vessel, means arranged to be initially set in advance of the movement of said vessel to cause said vessel to travel a predetermined course, means operable at will from a distance and including a tuned electric circuit for changing the set condition of said first named means to cause said vessel to travel in a predetermined course, and means to release said initial setting means when the vessel is in motion.

26. A system for controlling a dirigible body, comprising means for steering said body away from a given horizontal plane, means for initially controlling said steering means for maintaining the body at a predetermined horizontal plane, means responsive to radiant energy for controlling said steering means to cause the body to take up a course at a different predetermined horizontal plane, and locking means for maintaining the body of the last named plane independently of said radiant energy responsive means.

27. In a submarine vessel, the combination with a rudder for steering said vessel vertically, means controlled by the pressure of the water surrounding said vessel and operatively connected to said rudder for maintaining the vessel at a predetermined depth, means controlled by radiant energy for modifying the action of said depth control means, and means for locking said modifying means in displaced position.

28. In a dirigible body, the combination of a rudder arranged to control the movement of said body about a horizontal axis, a diaphragm exposed on one side to the pressure of the surrounding fluid medium, yielding means effective against the opposite side of said diaphragm to counteract the pressure of said surrounding medium, means for operating said rudder, means controlled by the movement of said diaphragm for actuating said rudder operating means, a lever connected to said actuating means, means operated by radiant energy for shifting said lever to modify the action of said actuating means, and a latch for holding said lever in its operated position.

29. In a submarine body, the combination with a rudder for steering said body about a horizontal axis, pressure variant means for controlling said rudder to stabilize said vessel with respect to a predetermined horizontal plane, means for modifying the action of said pressure variant means, means controlled by radiant energy for actuating said modifying means, and means for locking said modifying means in actuated position.

30. In a submarine body, the combination with a rudder for steering said body about a horizontal axis, pressure variant means for controlling said rudder to stabilize said vessel with respect to a predetermined horizontal plane, means for modifying the action of said pressure variant means, means controlled by radiant energy for actuating said modifying means, and means for maintaining said modifying means in actuated position independently of the cessation of the radiant energy.

In witness whereof I have hereunto set my hand this 2nd day of November, 1918.

JOHN HAYS HAMMOND, Jr.

In witness whereof I have hereunto set my hand this 2nd day of November, 1918.

ALBERT D. TRENOR.